United States Patent [19]

Tsukamoto

[11] 4,260,523

[45] Apr. 7, 1981

[54] MAGNETIZED ACTIVE CARBON COMPOSITION

[75] Inventor: Kenkichi Tsukamoto, Tokyo, Japan

[73] Assignee: Siako Tsukamoto, Tokyo, Japan

[21] Appl. No.: 3,390

[22] Filed: Jan. 15, 1979

Related U.S. Application Data

[63] Continuation-in-part of Ser. No. 661,355, Feb. 25, 1976, abandoned.

[30] Foreign Application Priority Data

Feb. 26, 1975 [JP]  Japan ................................. 50/24215

[51] Int. Cl.³ ...................... B01J 21/18; C04B 35/64; C04B 35/26; A24D 1/04
[52] U.S. Cl. ............................... 252/447; 252/62.55; 252/62.56; 131/341; 131/276; 131/333; 429/10
[58] Field of Search .................. 252/447, 62.55, 62.56; 131/10.7, 10.9, 261 R, 262 R, 262 B; 429/10

[56] References Cited

U.S. PATENT DOCUMENTS

| | | | |
|---|---|---|---|
| 1,789,507 | 1/1931 | Aarts | 252/447 |
| 2,479,930 | 8/1949 | Herkenhoff et al. | 252/447 X |

OTHER PUBLICATIONS

High Frequency Application of Ferrites, J. Roberts, Imperial College of Science and Technology U. of London copyright 1960, pp. 2-3.

*Primary Examiner*—Delbert E. Gantz
*Assistant Examiner*—William G. Wright
*Attorney, Agent, or Firm*—Bucknam and Archer

[57] ABSTRACT

Magnetized active carbon composition consisting of active carbon and a magnetized ferromagnetic material mixed therewith has enhanced properties of active carbon, and may be used in order to remove carbon monoxide, hydrogen and nicotine from tobacco smoke and to control reactions in soil. The above properties are enhanced by applying a magnetic field and/or an electrostatic field to the magnetized active carbon.

14 Claims, 5 Drawing Figures

MAGNETIZED ACTIVE CARBON COMPOSITION

CROSS REFERENCE TO RELATED APPLICATION

This application is a continuation-in-part of United States patent application Ser. No. 661355 filed Feb. 25, 1976, now abandoned.

The present invention relates to a magnetized active carbon composition comprising active carbon and a magnetized ferromagnetic material mixed therewith, a method for reinforcing activities of active carbon using this magnetized active carbon composition, and applications and devices related to said reinforcing method.

The present invention has been completed as a result of research work made with a view to enhancing the known properties of active carbon such as adsorbing, catalytic and electron-collecting capacities, and to providing industrially advantageous related applications and devices.

According to another aspect of the present invention, there is provided a magnetized active carbon composition comprising active carbon and a magnetized ferromagnetic material mixed therewith which is effectively used for removing carbon monoxide and hydrogen and the like from cigarette or tobacco smoke.

Active carbon has a capacity of adsorb a variety of gaseous components ranging from those having a relatively low molecular weight to those having a high molecular weight, and it shows high adsorbing capacity even when the concentration of these gaseous components is very low. Further, the activities of active carbon are scarcely influenced by humidity, and it is able to exhibit its special capacities in a reaction system of either the vapor phase or liquid phase.

Active carbon has a catalytic effect on sulfurous acid gas, nitrogen oxides, ozone, chlorine and the like, and, as is well-known in the art, it catalyzes them according to the following reactions:

Sulfurous acid gas:

$$SO_2 + \tfrac{1}{2}O_2 \rightarrow SO_3 \text{ and } SO_3 + H_2O \rightarrow H_2SO_4$$

Nitrogen oxides:

$$NO + \tfrac{1}{2}O_2 \rightarrow NO_2$$

and $$4NO_2 + 2H_2O + O_2 \rightarrow 4HNO_3$$

Ozone:

$$2O_3 + C \rightarrow 2O_2 + CO_2$$

chlorine:

$$2Cl_2 + 2H_2O + C \rightarrow 4HCl + CO_2$$

In an oxidizing atmosphere accelerating deelectronation, active carbon present in the atmosphere controls diffusion of electrons and exerts an electron-collecting effect. Accordingly, active carbon is capable of controlling the electro-magnetic character value in such an atmosphere.

Cigarette or tobacco smoke includes carbon monoxide, hydrogen and the like which inhibit the activity of the translation system (electron charge migration system) in the oral and bronchial tissues of a smoker and which are harmful to the maintenance of the inherent characters of these tissues (magnetic field and electric field). Conventional active carbon products are very poor at inhibiting and moderating these harmful effects of carbon monoxide, hydrogen and the like.

According to the present invention, there is provided a magnetized active carbon composition having a highly improved and heretofore unattainable effect of removing translation system-inhibiting substances such as carbon monoxide, hydrogen and the like, and by utilizing this magnetized active carbon composition in cigarette filters and the like, a novel detoxicating mechanism can be obtained. More specifically, the smoker can enjoy cigarette smoke having a character value of the electromagnetic field enhanced to a high level by cohesion of the magnetic field and orientation of the magnetic field and furthermore the reduction of the living electromagnetic field inherent of the tissue of the respiratory tract can be inhibited (inhibition of the diluting effect can be attained).

There is a close relation between the electromagnetic character value of inhaled air and the effect of the cilia in removing foreign matter (e.g. phlegm, dust, pathogenic bacteria and the like), and reduction of the electromagnetic character value results in inhibition of this effect. In view of this fact, the detoxicating effect of the magnetized active carbon composition of the present invention will readily be understood.

Another object of the present invention is to provide a method and device for enhancing the adsorbing, catalytic and electron-collecting properties of active carbon, in which at least one of a magnetic field and/or an electrostatic field is applied to a composition comprising active carbon and a magnetized ferromagnetic material mixed therewith.

According to this method and device, smoke to be treated is contacted with an applied electrostatic field to increase the number of oriented and polarized particles in the smoke, and these particles are aggregated by the applied magnetic field and there is brought about a tendency that the quantity of the particles trapped in the magnetic field is increased. This tendency is preferred for providing a smoke having a high electromagnetic character value, and the cohesion activity of active carbon is reinforced by this tendency. The increase of the cohesion activity and the increase of the quantity of trapped particles will be apparent from the following formulae (1) and (2):

$$R = \frac{10 \cdot M \cdot V}{e \cdot H} \tag{1}$$

in which:
 R = the radius of diffusion movement of oriented (charged) particle,
 M = the mass of oriented (charged) particle,
 V = the velocity of oriented (charged) particle,
 e = the charge of oriented (charged) particle, and
 H = the intensity of the applied magnetic field.

Thus, the diffusion movement radius is in reverse proportion to the intensity of the applied magnetic field, and the diffusion movement of particles is reduced with an increase in the intensity of the applied magnetic field, resulting in enhancement of the tendency for particles to cohere.

Suppose that two oriented (polarized) particles in a smoke are at the center of the magnetic flux in the region of the magnetic field and that the magnetic flux is constant through the space between the particles (homogeneous magnetic flux) and is perpendicular to both the ends of the particles, the attractive force acting between the particles is expressed as follows (see M. Wada & A. Ohba, Manuscripto Recuperation de Hierro y Otros Minerales de Laterites, IX Congreso Latinamericano de Quimica, p. 4 (1965)).

$$Fg = \frac{1}{2\mu_0 a_g} \left(\frac{g_g B_1 a_1}{g_1}\right)^2 = \frac{1}{2\mu_0 a_g} \left(\frac{g_g B_2 a_2}{g_2}\right)^2 \quad (2)$$

in which:
Fg = the attractive force between the particles,
$a_1$ = the cross-sectional area of particle 1,
$a_2$ = the cross-sectional area of particle 2,
$a_g$ = the cross-sectional area of the space between particles 1 and 2,
$g_1$, $g_2$, $g_3$ = the leakage coefficient of the magnetic flux,
$B_1$, $B_2$ = the flux density, and
$\mu_o$ = the magnetic permeability of the medium.

Thus, the attractive force acting between the two particles increases in proportion to the square of the magnetic flux to increase the aggregation and cohesion.

Prof. O. Warburg et al., biochemists of Max Plank Research Institute, Germany, conducted research work on autoxidation of amino acids catalyzed by active carbon and found that the catalytic activity of active carbon depends on the amount of iron present in the system (see O. Warburg, "Heavy Metal Prosthetic Group", p. 28, Oxford Univ. Press (1921)).

From the fact of conversion of p-hydrogen and o-hydrogen confirmed by the assay of the chemical activities of the molecules and surfaces of various crystals, it is apparent that molecules of hydrogen are changed when a magnetic field is applied thereto.

More specifically, molecules of hydrogen include two isomers, i.e., para-isomer and ortho-isomer, and these isomers are generally present at a ratio of 1:3 and the transformation of these isomers is practically impossible without the use of a catalyst. The probability of this transformation is substantially zero from the viewpoint of the quantum theory. However, this transformation is made possible under the application of a magnetic field (see U. Farkas and Z. Sachsse, Physik. Chem. (B), 23, 1 (1933) and Farkas, Ortho-hydrogene, Parahydrogene and Heavy Hydrogen (1935)).

Accordingly, the fact that the applied magnetic field makes changes in the symmetry of factors of the inherent function by changing the nuclear spin of hydrogen molecules from ↑↓ to ↑↑ means that the number of rotatory quanta is increased and the tendency of magnetic cohesion is intensified, and that the structure of hydrogen molecules which are uneven in molecular weight and are gravimetrically unstable is simultaneously changed. In view of the fact that iron and a magnetic field are identical with each other, from the point of view that each of them includes unpaired electrons at a very high density, and that the velocities of all the reactions depend on the level of non-localization, it is construed that the effect of increasing the ratio of removal of carbon monoxide and hydrogen according to the present invention is attained according to the following mechanism:

A magnetized active carbon composition having a magnetized ferromagnetic material incorporated therein has its catalytic activity enhanced and carbon monoxide and hydrogen are converted to $CO_2$ and $H_2O$, respectively, by this enhanced catalytic activity according to the following reactions:

Carbon monoxide: $2CO + O_2 \rightarrow 2CO_2$

Hydrogen: $2H_2 + O_2 \rightarrow 2H_2O$

Baskin et al. reported that the inherent intensity of the magnetic field of a living body is reduced by 4% by the death thereof (see Erwin Bauer & A. Raskin, Nature, p. 801, Nov. 7, 1936). Further, according to experiments by Senftle and Thorpe, it was confirmed that the magnetic susceptibility of cancerous cells is much lower than that of normal cells (see Frank E. Senftle and Arthur Thorpe, C & EN, p. 38, May 29, 1961). Approaches based on the nuclear magnetic resonance (NMR) spectroscopy disclosed that the width of the protonic NMR signal of water is much narrower than the width of a protonic signal from a living macromolecule and since both the signals can easily be distinguished from each other, protonic signals are important for assy of aqueous components of complicated systems (biological systems). Thus, water of a cancerous tissue can be distinguished from water of a normal tissue by measuring the spin lattice-moderating time in the spin echo nuclear magnetic resonance and the spin-spin moderating time. In other words, the most conspicuous characteristic of water of a cancerous tissue resides in increase of the time of moderating the proton spectrum of tissue water.

Cancer is characterized by increase of the degree of freedom of motion in molecules of tissue water, more specifically, by increase of the non-orderly degree of hydrogen and difference of the Larmor period in protons, and proton signals of water of a cancerous tissue are obviously different from radio waves emitted from a normal tissue (see Tumor Detection by Nuclear Magnetic Resonance, Science, March, 1971, vol. 171).

From the fact that the above-mentioned increase in the number of rotatory quanta caused by conversion of para-hydrogen→ortho-hydrogen has a great influence on the proton spectrum, the hydration and the structural change in water, it may be construed that transformation of the structure of molecules of tissue water is nothing but a change in the magnetic character. It has been proved that when electrons are arranged and the magnetic field is lost, cells cannot be controlled any more and they are cancered.

Further, as references proving that magnetism has a carcinostatic activity, there can be mentioned Japanese Patent No. 319,970 specification (Japanese Patent Publication No. 3915/66) and a research report published by the Medicinal Department, Ohio University (see Cancer, August 1971).

The living substances in tobacco leaves are known to have a mesophase structure and, according to the classification based on the molecular orientation, cell membranes of tobacco leaves have a structure of semectic mesophase and chlorophyll has a structure of neumatic mesophase. The majority of other tissues of tobacco leaves include compounds of a structure of cholesteric mesophase which is a derivative of the sterol structure (see G. T. Stewart, Ordered Fluids and Liquid Crystals, 141 (1966) and The Journal of the American Oil Chemists' Society, 45, 120 (1968)).

Tobacco leaves, especially liquid crystals and groups of liquid crystals thereof, are partially caused to carry latently CO and/or H thereon and show the diffusion state, when they are smoked.

Cell membranes and other living substances of tobacco leaves have a characteristic property that they respond to a slight external force. Since constituent molecules of a liquid crystal can rotate or migrate in a space, it has very characteristic electric and magnetic properties. For example, cholesteric mesophase is converted to neumatic mesophase under application of an electrostatic field or a magnetic field. Since the spiral structure is converted to a structure in which molecules are parallelly oriented, this change is very violent, and further, this great change of the molecular orientation or arrangement is caused by application of a relatively small magnetic or electrostatic field.

In case of a typical model, the elastic energy of torsion is about $4 \times 10^{-3}$ Cal/M, and it is about $10^{-5}$ of the energy necessary for arranging all of the molecular axes.

According to Meyer, the electrostatic field (Ec) and magnetic field (Hc) causing transition are expressed as follows:

$$Ec = \frac{2\pi}{P_o}(\frac{K_{22}}{\Delta Xe})^{\frac{1}{2}} \text{ and } Hc = \frac{2\pi}{P_o}(\frac{K_{22}}{\Delta Xm})^{\frac{1}{2}}$$

in which:
Po = the spiral pitch at Ec = O and Hc = O,
ΔXe = the anisotropy of electric susceptibility,
ΔXm = the anisotropy of magnetic susceptibility, and
$K_{22}$ = the torsion elasticity.

(See R. B. Meyer, Applied Physics Letter, May 1, 1968).

If in the above equation, Po = 5,000 Å, the anisotropy Δε of dielectric constant≈1.0, the anisotropy Δμ of permeability≈$1 \times 10^{-4}$ and $K_{22}$≈$10^{-6}$ dyn, Ec is nearly equal to $10^5$ V/cm and Hc is equal to $10^5$ Oe, which values are substantially in agreement with found values.

Also Gennes stated, as a result of calculation of the phase transition by application of a magnetic field, that if Po≈1 μm and ΔX≈$10^{-5}$, a value of Hc≈$1.5 \times 10^4$ Oe is given (see P. G. De Gennes, Solid State Communications, 6, 163, 1968).

Molecules of living substances constituting liquid crystals of tobacco leaves (as well as liquid crystals of the respiratory tissue of a man) are oriented and polarized under application of an unimaginably small electric field or magnetic field as mentioned above, and direct causes of this phenomenon are the anisotropy of the dielectric constant and the anisotropy in the magnetic permeability.

A relation represented by the following equation is established between the above anisotropies and the electric and magnetic fields (see Acta Physicochim, USSR, 18, 358, 1943):

$$(|C|+|\epsilon_1-\epsilon_{11}|)E^2=(\mu_{11}-\mu_1)H^2$$

in which:
C = constant,
$\epsilon_1$ = the dielectric constant in the direction perpendicular to the molecular axis,
$\epsilon_{11}$ = the dielectric constant in the direction parallel to the molecular axis,
E = electrostatic field,
$\mu_{11}$ = the magnetic permeability in the direction parallel to the molecular axis,
$\mu_1$ = the magnetic permeability in the direction perpendicular to the molecular axis, and
H = magnetic field.

In molecules of liquid crystals of tobacco leaves (as well as molecules of liquid crystals of the respiratory tissue of a man), the absolute value of the magnetic susceptibility is minimal in the direction of the molecular axis, and therefore, under application of a magnetic field, molecules and groups of molecules are magnetically oriented in the direction of the longer axis and the electric susceptibility (the intensity of the electostatic field) is increased.

Further, as will be apparent from the above equation, under application of an electric field, the magnetic susceptibility (the intensity of the magnetic field) is increased.

In case oxidation and perioxidation (each being deelectronation) are accelerated, in contrast to the case of application of an electric field, the intensity of the electric field is reduced, which, in turn, causes a reduction in the intensity of the magnetic field. Thus, deelectronation results in demagnetization and demagnetization results in deelectronation.

From the physical viewpoint, either a magnetic field or an electrostatic field consists of photons, and the magnetic action is nothing but an electronic action. Since the magnetic field can be regarded as an arranged spin wave of electrons, it is considered that the magnetic field is nothing but an arranged field of electrons. Since all substances have an inherent magnetic character, each cell, tissue, organ or other organic body must have its inherent magnetic field, and in view of the fact that the levels of energies of chemical linkages in molecules regulate the possibilities of interrelations among respective substances, it can be considered that the levels of energies of molecule linkages, which are to express the magnetic characteristics of substances, are changed, in turn, by variations of the magnetic characteristics in substances and are influenced by the transformation of substances. Also an electric current forms a magnetic field, and a magnet can be regarded as an assembly of small currents. In contrast, the quantity of magnetism differs from the quantity of electricity from the point of view that it is not an unvariable quantity inherent in a substance, and the presence of a quantity of magnetism is a statistical phenomenon caused by the non-uniform distribution of particles having a magnetic moment. It is apparent that a small magnetic field formed by particles having a dipole moment in a certain system, namely a magnetic character of a substance, is influenced by the temperature, the external magnetic field (outside the system), the force of the electric field and the orientation with respect to the directions of these magnetic and electric fields. An electric potential is generated as a result of a chemical interrelation of substances caused by change in magnetic characters of the substances, and once the electric potential is generated, it comes to have influences on the magnetic character of the substance. Thus, an unseparable unit body, namely an electromagnetic state of a living tissue or a polarity, is generated through the actions of a living body. On the one hand, the polarity can be regarded as expressing a certain property involved in transformation of an organic substance, and on the other hand, the polarity per se clarifies the property of transformation of the substance. The change in the magnetic character of a substance and hence, the change in polarity are naturally influenced through the living actions of the organic body.

It may be considered that the magnetic field causes different levels of susceptibility in a living body. More specifically, the magnetic field causes re-orientation of living macromolecules at the molecular level and it changes the direction of acting elementary particles (e.g. electrons, ions, etc.) and the intensity of the living body potential at the cellular level, whereby the speed of permeation of ions through cell membranes is changed. Accordingly, it is apparent that the magnetic field changes the direction and intensity of a biochemical processes advancing in cells.

All growth phenomena taking place on the earth involve a lethal factor therein. More specifically, when a living tissue continues growth, an optimum condition for survival of the tissue system (the balanced equilibrium) defined by the interrelation with the environmental character value is arrived at.

However, at this point, the tissue system generally fails to perform self-control, and therefore, the optimum condition is passed and a climax condition is finally arrived at. Accordingly, the normal growth of the tissue system is inhibited and degeneration begins and the tissue system tends to be transformed to a tissue system in which a different metabolism is prevalent.

Peroxides (deelectronated and demagnetized materials) and related phenomena are chemically fatal to living bodies living in an oxygen-containing atmosphere. They have various harmful effects on living bodies through various mechanisms and cause malfunctions of various capacities of living bodies and a reduction in the defense strength of living bodies to bring about cancer of the lung and the like (see Kazuo Fukusumi, Oil Chemistry, 14, 119 (1965), and Hiroyuki Kono, Journal of Japanese Association of Eastern Medicine, 21 (4), 195 (1971)). It is a significant problem that constituent proteins of living bodies which are known to be proteins having a translation system are deelectronated and demagnetized and thus converted to primitive proteins of the state free of the charge migration system such as were generated on the earth when there was neither light nor oxygen on the earth. When the translation system of a living body is inhibited by carbon monoxide, hydrogen and the like, the deelectronated and demagnetized state is brought about in the living body and the electric field and magnetic field (about $10^{-6}$ to $10^{-7}$ gauss) of the inherent maintenance character are diluted.

It is known that as a factor causing cancer, the reduction in the defense strength of a living body should naturally be considered, and this reduction is nothing more than damage caused by peroxides (deelectronated and demagnetized materials).

Premature cancer of the lung does not always advance to progressive cancer. The actions of atomic rays and various carcinogenic substances are related to the formation of peroxides (deelectronated and demagnetized materials) and the oxidation (deelectronation and demagnetization) of SH groups. Reduction of delayed allergic reactions or transplantation-rejecting reactions is a substantially important reason for the incurability of cancer, namely, this is the reason why cancer can be cancer. In view of the foregoing fact in the light of the immunity-controlling activity of radiation (the main action of which is considered to be due to peroxides (deelectronated and demagnetized materials)), it is apparent that the generation of cancer is caused by the effects of peroxides (deelectronated and demagnetized materials).

Various research work suggests that immunological control of auto-cancer (spontaneous cancer) will be possible.

Cancerous living bodies are characterized by a reduction in the activity of an enzyme (catalase) decomposing hydrogen perioxide, the specific energy metabolism of capture of glucose from surroundings by vigorous sugar consumption of cancerous cells, a reduction in the speed of the reaction of removing peroxides (deelectronated and demagnetized materials) by glutathione, and an increase in the excretion of polyamines. In other words, cancer patients are characterized by an abnormal level of the scrum SH group, creatine urine, the abnormal metabolism of vitamin C, a reduction in the methylene blue-reducing activity of blood plasma or the like, an abnormal oxidation-reduction potential of the blood, an increase in the values of peroxides (deelectronated and demagnetized material) in serum, and a reduction in the serum-dialyzing calcium value. Each of these characteristic symptoms suggests that cancer is a disease having a close relation to the effect of peroxides (deelectronated and demagnetized materials).

In the field of molecular biology, it is known that the peroxidized state (deelectronated and demagnetized state) in a living body inhibits the duplicating mechanism by nucleic acids (see Lester Backer and James Smith, Laurence-Barkley Laboratory, Calfornia University; Bulletin of American Science Academy, 1974).

As the mitosis of cells having a biochemically stable mechanism, there can be mentioned the metabolism of nucleic acids (DNA and RNA). DNA is discontinuously synthesized, and RNA is first synthesized prior to the synthesis of DNA (see Reiji Okazaki, Molecular Biological Laboratory, Collection of Experimental Reports, 1972).

By V. U. Strekova, G. A. Tarakanova, V. P. Prudnikova and U. I. Novitskiiv, it was confirmed that RNA of the normal growth stage is remarkably increased in a living body by the application of a magnetic field (see Fiziol, Past 12: 920–929, 1965).

It is also known that in cancered cells, magnetism remarkably inhibits synthesis of DNA and RNA.

In view of the foregoing knowledge, it will readily be understood that electromagnetic fields and the environments of electromagnetic fields are very important for continuing reproduction in a living body without having harmful effects influence on nucleic acids, and that in electromagnetic field environments sufficient not to unbalance the dynamic equilibirum, normal metabolism of nucleic acids is enhanced and metabolism of cancerous nucleic acids is inhibited.

It is known that the inhalation of air having a high electromagnetic character value is effective for restoring normal biological states in the abnormal functions of organs in a living body.

Generally speaking, anions (magnetic ions) contribute to the activation of parasympathetic nerves and cations (magnetic ions) contribute to the activation of sympathetic nerves. It is known that these magnetic ions in the mixed state correct the acidalkali equilibrium in blood, reduce the blood pressure, have a curing effect on anemia, remove fatigue by promoting the functions of cell endoplasm, and have the effects of curing biolysis, moderating inflammations and curing incised wounds and the like. It is said that the ideal density of magnetic ions (as anions) necessary for maintenance of the health in human bodies is 400 to 1000 ions per cc of air.

Tables 1 and 2 show the densities of air ions (magnetic ions) at various places in Japan, together with magnetic characteristics (magnetic susceptibility) of air and the composition of air.

TABLE 1

| Place | Ion Density | |
|---|---|---|
| | negative ions | positive ions |
| mountain | 692 | 670 |
| suburbs | 230 | 270 |
| city | 101 | 150 |
| subway | 117 | 279 |
| ship (engine room) | 30 | 40 |
| office | 38 | 43 |
| living room in suburbs | 114 | 170 |
| air-conditioned room | 56 | 70 |
| factory | 53 | 73 |

Note:
Each value is in terms of the number of ions per cc of air and the measurement was conducted from September to December, 1965 (see date concerning "Yothtron", an air ion generator manufactured by Ikegami Tsushinki Kabushiki Kaisha).

TABLE 2

| Component | Magnetic Susceptibility, $1 \times 10^{-6}$ e.m.u. | % by Volume | % by Weight | Partial Pressure, mmHg |
|---|---|---|---|---|
| $N_2$ | −0.34 | 78.63 | 75.47 | 593.02 |
| $O_2$ | 106.20 | 20.99 | 23.20 | 159.52 |
| Ar | −0.45 | 0.93 | 1.28 | 7.114 |
| $CO_2$ | −0.42 | 0.33 | 0.04 | 0.228 |
| (CO) | −1.85 | — | — | — |
| $H_2$ | −1.97 | 0.01 | 0.001 | |
| Ne | −0.33 | 0.0013 | 0.0012 | 0.088 |
| He | −0.47 | 0.0005 | 0.00007 | |

Note:
1) The air composition and the magnetic susceptibility of each component as measured at 20° C. are shown.
2) The fact that all gases other than oxygen have a negative value magnetic susceptibility indicates that each of them is a diamagnetic substance.

Smoked substances formed during the smoking of cigarettes are substances having a very low electromagnetic character value, which inhibit the translation system in tissues of the lung and respiratory tract of the human smoker, and among substances inhaled by a man, they are typical instances of deelectronated and demagnetized materials having an electronic and magnetic dilution effect harmful to maintenance of the inherent characters (electric field and magnetic field) of living tissues and the surrounding electromagnetic fields. However, according to the present invention, since the ratios of removal of carbon monoxide, hydrogen and the like are remarkably enhanced and it is made possible to form smoked substances of tobacco having an electromagnetic tendency (character) remarkably enhanced by dielectric polarization and/or orienting polarization and hence, having an improved resistance to the dilution of the surrounding electromagnetic fields, the mechanism of the translation system in tissues of a human body (oral cavity, nasal cavity, bronchus, lung and the like) can be effective maintained and the formation of peroxides (deelectronated and demagnetized materials) can be inhibited. In short, the dangerous effects of smoking, especially the risk of cancer, can be advantageously moderated according to the present invention.

Still another object of the present invention is to provide a method for controlling reactions in soil, in which a composition comprising active carbon and a magnetized ferromagnetic material mixed therewith is used for catalyzing the conversion of nitrogen oxides (NO, $NO_2$ and the like) in the soil to nitrogen of the nitrate form.

A nitrogenous fertilizer used as a growth promotor for the cultivation plants and turfs forms large quantities of nitrogen oxides in an applied field (soil), and these substances are finally transferred into the stratosphere where they effect a reduction in the level of ozone. Nitrogen fertilizer is thus acting as a primary agent in destroying the ozone layer of the stratosphere and the corresponding drastic increase in the generation of skin cancer.

The magnetized active carbon composition of the present invention containing a magnetized substance has a much higher catalytic activity for the conversion of these harmful nitrogen oxides to nitric acid according to the reaction represented by the above-mentioned chemical reaction scheme than conventional active carbon products. Accordingly, when the magnetized active carbon composition of the present invention is applied to soil, the above-mentioned problem of the increased generation of skin cancers can be greatly moderated.

Materials which are obtained by magnetizing substances such as Fe, $Fe_3O_4$, $\gamma$-$Fe_2O_3$ and the like are preferably incorporated in active carbon according to the present invention. In general, magnetized ferromagnetic substances may also be employed which are obtained by magnetizing ferromagnetic substances such as ferrite of the spinel-type structure, ferrite of the magnetoplumbite structure, ferrite of the garnet-type structure, ferrite of the probeskite-type structure, ferrite of the ilmenite-type structure, ferrite of the rutile-type structure, ferrite of the ferroxplana-type structure, alloy of the precipitation hardening-type structure, alloy of the $\gamma$-$\alpha$ transformation-type structure, alloy of the supper-lattice-type structure and alloy of the rare earth-cobalt-type structure.

Ferrite of the spinel-type structure is represented by the general formula $MO \cdot Fe_2O_3$ (in which M stands for at least one divalent metal). For example, there can be mentioned $MnFe_2O_4$, $CoFe_2O_4$, $CuFe_2O_4$, $MgFe_2O_4$, $NiFe_2O_4$, $Ni_{0.3}Zn_{0.45}Fe_{2.25}O_4$, $Co_{0.8}Fe_{2.2}O_4$, $Co_{0.3}Mn_{0.4}Fe_2O_4$, $Co_{0.3}Zn_{0.2}Fe_{2.2}O_4$, $Zn_{0.61}Fe_{2.39}O_4$, $MnFe_2O_4$, $Mn_{0.45}Zn_{0.35}Fe_{2.2}O_4$, $Mn_{0.38}Ni_{0.39}Fe_{2.23}O_4$, $Fe_3O_4$, $\gamma$-$Fe_2O_3$, $Li_{0.5}Fe_{2.5}O_4$ and titanium solid solution thereof, e.g. $MnTi_{0.44}Fe_{1.56}O_4$, and the like.

The magnetic characteristics (saturation magnetization values as measured at 20° C.) of the preferred magnetized materials are as follows:

TABLE 4

| | Magnetic Characteristics (saturation magnetization value as measured at 20° C.) | | |
|---|---|---|---|
| Material | $\sigma$ gauss cc/g | Ms gauss | $\pi$ 4 Ms gauss |
| $Fe_3O_4$ | 92 | 480 | 6000 |
| $MnFe_2O_4$ | 80 | 400 | 5000 |
| $CoFe_2O_4$ | 80 | 425 | 5300 |
| $NiFe_2O_4$ | 50 | 270 | 3400 |
| $CuFe_2O_4$ | 25 | 135 | 1700 |
| $MgFe_2O_4$ | 27 | 120 | 1500 |
| $Li_{0.5}Fe_{2.5}O_4$ | 65 | 310 | 3900 |
| $\gamma$-$Fe_2O_3$ | — | — | 5800 |

Ferrite of the magnetoplumbite-type structure is represented by the general formula $MO \cdot 6Fe_2O_3$ (in which M stands for at least one divalent metal). For example, there can be mentioned $BaFe_{12}O_{19}$ ($4\pi Ms=4800$ gauss), $BaO.6Fe_2O_3$ ($4\pi Ms=4800$ gauss), $SrO.6Fe_2O_3$ ($4\pi Ms=4500$ gauss), $CaFe_4O_7$ ($4\pi Ms=980$ gauss) and titanium solid solution thereof, and the like. The saturation magnetization values were measured at 20° C.

Ferrite of the garnet-type structure is represented by the general formula $3M_2O_3.5Fe_2O_3$ (in which M stands for at least one trivalent metal). For example, there can be mentioned $Y_3Fe_5O_{12}$ ($4\pi Ms=1740$ gauss), $Sm_3Fe_5O_{12}$ ($4\pi Ms=1695$ gauss), $Eu_3Fe_5O_{12}$ ($4\pi Ms=1100$ gauss), $Gd_3Fe_5O_{12}$ ($4\pi Ms=169$ gauss), $Tb_3Fe_5O_{12}$ ($4\pi Ms=190$ gauss), $Dy_3Fe_5O_{12}$ ($4\pi Ms=537$ gauss), $Ho_3Fe_5O_{12}$ ($4\pi Ms=976$ gauss), $Er_3Fe_5O_{12}$ ($4\pi Ms=1308$ gauss), $Tm_3Fe_5O_{12}$ ($4\pi Ms=1100$ gauss), $Yb_3Fe_5O_{12}$ ($4\pi Ms=1640$ gauss), $Lu_3Fe_5O_{12}$ ($4\pi Ms=1500$ gauss) and titanium solid solution thereof, and the like. The saturation magnetization values were measured at 20° C.

Ferrite of the probeskite-type structure is represented by the general formula $M_2O_3.Fe_2O_3$ (in which M stands for at least one trivalent metal). For example, there can be mentioned $La_{0.7}Sr_{0.3}MnO_3$ ($M_B=3.6\times4\pi\times10^{-7}$ Wb−m/kg), $Bi_{0.7}Ca_{0.3}MnO_3$ ($M_B=0.5\times4\pi\times10^{-7}$ Wb−m/kg), $Nd_{0.5}Ca_{0.2}MnO_3$ ($M_B=60\times4\pi\times10^{-7}$ Wb−m/kg), $Nd_{0.6}Sr_{0.4}MnO_3$ ($M_B=75\times4\pi\times10^{-7}$ Wb−m/kg), $Nd_{0.6}Ba_{0.4}MnO_3$ ($M_B=70\times4\pi\times10^{-7}$ Wb−m/kg), $Gd_2CoMnO_5$ ($M_B=2.5\times4\pi\times10^{-7}$ Wb−m/kg) and the like.

Ferrite of the ilmenite-type structure is represented by the general formula $A^{2+}.B^{4+}O_3$. For example, there can be mentioned $FeTiO_3$ ($M_B=5.23\times4\pi\times10^{-4}$ Wb−deg/mol at 20° C.), $NiTiO_3$ ($M_B=3.16\times4\pi\times10^{-4}$ Wb−deg/mol at 20° C.), $CoTiO_3$ ($M_B=5.46\times4\pi\times10^{-4}$ Wb−deg/mol at 20° C.), $MnTiO_3$ ($M_B=4.55\times4\pi\times10^{-4}$ Wb−deg/mol at 20° C.), $FeTiO_3.Fe_2O_3$ ($Ms=0.7\times7.96\times10^8$ C.G.S. at 20° C.), $NiTiO_3.Fe_2O_3$ ($Ms=0.5\times7.96\times10^8$ C.G.S. at 20° C.), $CoTiO_3.Fe_2O_3$ ($Ms=0.45\times7.96\times10^8$ C.G.S. at 20° C.), $MnTiO_3.Fe_2O_3$ ($Ms=0.1\times7.96\times10^8$ C.G.S. at 20° C.), $CoMnO_3$, $NiMnO_3$, $Fe_{2-x}Ti_xO_3$ ($1>x\geq0.5$) and the like.

As the ferrite of the rutile-type structure, there can be mentioned, for example, $CrO_2$ ($4\pi Ms=7200$ gauss at 20° C.). Ferrite of the ferroxplanatype structure, is represented by the general formula $Fe_2O_3$-$BaO$-$M^{2+}O$ (in which M stands for Mn, Fe, Co, Ni, Cu, Mg or Zn). For example, there can be mentioned $Ba_2Mg_2Fe_{12}O_{22}$ ($4\pi Ms=1500$ gauss), $BaMn_2Fe_{16}O_{27}$ ($4\pi Ms=3900$ gauss), $Ba_2Mn_2Fe_{12}O_{22}$ ($4\pi Ms=2100$ gauss), $Ba_2Fe_2Fe_{16}O_{27}$ ($4\pi Ms=4000$ gauss), $Ba_2Co_2Fe_{12}O_{22}$ ($4\pi Ms=2300$ gauss), $Ba_3Co_2Fe_{24}O_{41}$ ($4\pi Ms=3350$ gauss), $BaNi_2Fe_{16}O_{27}$ ($4\pi Ms=4150$ gauss), $Ba_2Ni_2Fe_{12}O_{22}$ ($4\pi Ms=1600$ gauss), $Ba_3Cu_2Fe_{24}O_{41}$ ($4\pi Ms=3100$ gauss), $Ba_2Zn_2Fe_{12}O_{22}$ ($4\pi Ms=2850$ gauss), $Ba_3Zn_2Fe_{24}O_{41}$ ($4\pi Ms=3900$ gauss) and titanium solid solution thereof, and the like. The saturation magnetization values are measured at 20° C.

As the alloy of the precipitation hardening-type structure, there can be mentioned, for example, $Co_{24}.Ni_{14}.Al_8.Cu_3.Fe_{bal.}$ (($B.H)_{max}=5.2$ MGOe), $Co_{34}.Ni_{15}.Al_7.Ti_5.Cu_4.Fe_{bal}$ (($B.H)_{max}=11$ MGOe) and $Fe_{40-50\%}.Cr_{27-30\%}.Co_{23-25\%}.Mo_{1\%}>Si_{1\%}>$ (($B.H)_{max}=5$ MGOe).

As the alloy of the γ-α transformation-type structure, there can be mentioned, for example, $Co_{50-54\%}V_{8-14\%}Fe_{bal}$ (($B.H)_{max}=5$ MGOe).

As the alloy of the supper-lattice-type structure, there can be mentioned, for example, $CoPt$ (($B.H)_{max}=9-12$ MGOe).

As the alloy of the rare earth-cobalt-type structure, there can be mentioned $Y.Co_5$ ($4\pi Ms=10600$ gauss at 25° C.), $LaCo_5$ ($4\pi Ms=9090$ gauss at 25° C.), $CeCo_5$ ($4\pi Ms=7700$ gauss at 25° C.), $PrCo_5$ ($4\pi Ms=12000$ gauss at 25° C.), $SmCo_5$ ($4\pi Ms=9650$ gauss at 25° C.), $(Ce-MM)Co_5$ ($4\pi Ms=8900$ gauss at 25° C.), $Sm_2(CoFe)_{17}$ (($B.H)_{max}=55$ MGOe), $Pr(CoFe)_{17}$ (($B.H)_{max}=56$ MGOe), $Pr_{0.55}Sm_{0.45}Co_5$ (($B.H)_{max}=26$ MGOe), $La_{0.5}Sm_{0.5}Co_5$ (($B.H)_{max}=13.2$ MGOe), $MM_{0.5}Sm_{0.5}Co_5$ (($B.H)_{max}=20.0$ MGOe), $Ce_{0.5}Sm_{0.5}Co_5$ (($B.H)_{max}=13.5$ MGOe) and $Sm_{0.75}Ce_{0.25}Co_{3.5}CuFe_{0.5}$ (($B.H)_{max}=12.3$ MGOe).

Ferromagnetic substances are generally magnetized by a known method of application of an external magnetic field. For example, one of the conventional methods of magnetizing ferromagnetic materials comprises applying from the outside a DC magnetic field of ampere-turns of an intensity 10 times or more of the product of the coercive force (Hc) inherent in a ferromagnetic material and the length (Lg, calculated value) of a gap between magnetic poles when the ferromagnetic material is magnetized. According to the above conventional method, however, a hysteresis loop inherent in the ferromagnetic material is described, the magnetic field must be applied until the direction of spontaneous magnetization is all oriented in the direction of the magnetic field, and irreversible residual magnetization remains even after the externally applied magnetic field has been removed. Such a conventional method is often called the saturation magnetization method for producing permanent magnets. The present invention essentially uses ferromagnetic materials magnetized by the saturation magnetization method.

A so-called magnetic material, and a ferromagnetic material which was magnetized by the saturation magnetization method exhibit different physical properties. The former may be certainly attracted by magnetism but is not the magnetized material referred to by the present invention. The former has not the line of magnetic force (spin wave).

It is also possible to perform the magnetization by adjusting the particle size of a ferromagnetic substance to the spontaneous magnetizing size. Examples of spontaneous magnetizing particle sizes are as shown below.

TABLE 3

| Material | Critical Diameter (μ) in Single Magnetic Domain | Upper Critical Diameter* (μ) in Single Magnetic Domain |
|---|---|---|
| MnBi | 0.8 | 8.0 |
| $BaO.6Fe_2O_3$ | 1.0 | 10.0 |
| $\gamma$-$Fe_2O_3$ | 0.4 | 1.5 |
| $Fe_3O_4$ | 0.4 | 2.0 |

*:the critical diameter at which the activity of the magnetic domain wall is lost.

It must be understood that the active carbon used in this invention includes not only active carbon products formed by known chemical-activating and gas-activating methods but also active carbon products prepared by mechanical grinding (frictional pulverizing) methods and ordinary heat-treating methods.

It is preferred that the magnetized material be incorporated into the active carbon in an amount of 30 to 100 parts by weight per 100 parts by weight of active carbon. In the present invention, however, sufficient effects can be obtained if the magnetized material is incorporated in an amount of about 5 parts by weight per 100 parts by weight of active carbon, and in some cases, beneficial effects can be attained even if the amount of the magnetized material is smaller than the above values. The upper limit of the amount of magnetized material added varies depending on the intended application. A suitable mixing ratio may be selected depending on the intended use, and on the application conditions.

The magnetic field to be applied for magnetization can be generated by a permanent magnet and an ordinary electric magnet.

The magnetized material to be incorporated in active carbon has preferably a powdery or granular form or other similar shape. When a device for applying a magnetic field for magnetization is employed, it is preferred that the magnet be of a ring-like, pipe-like form or other similar form, but the shape of the magnet is not limited to such forms. Appropriate shapes or forms which are considered effective for attaining the objects of the present invention may alternatively be chosen within the scope of the present invention.

The magnetized active carbon composition of the present invention can be prepared, for example, in the following manner.

Active carbon is physically mixed with a magnetized material, and if desired, the mixture is magnetized by a known method. In this case, the particle sizes may be adjusted to application sizes prior to the mixing treatment, or they may be adjusted after the mixing treatment. Further, the magnetized active carbon composition of the present invention may be prepared by mixing a magnetized material with a carbon material such as tar pitch, coconut husk carbon or sawdust carbon, molding the mixture into a prescribed form, subjecting the molded product to a known activating treatment and if desired, magnetizing the molded product. In some cases, a non-magnetized ferromagnetic substance may be used in place of the above magnetized material; the substance then being subjected to a magnetizing treatment in a conventional manner.

The shape and size of active carbon to be used in the present invention are not particularly critical, and commercially available products may be adopted in the present invention. It is most preferred that the size of the active carbon be within a range of 110 to 0.25 Tyler mesh. Also the shape and size of the magnetized material may optionally be chosen appropriately depending on the intended use, as in the case of active carbon.

In the treatment of tobacco smoke, the magnetized active carbon composition exerts beneficial effect when it is located in a place through which smokes pass. For example, the magnetized active carbon composition of the present invention may be located in a cigarette filter, in a cigarette holder or the like.

The electrostatic field to be applied in accordance with the present invention may be supplied by, for example, a negative electrode, a positive electrode, a non-insulating (uncovered) electric circuit, or negative and positive electrostatic potentials. As the element constituting an electrostatic field, there can be mentioned an ordinary small battery, an isotope battery and an electret. A radio electret including a minute amount of isotope without fear of leakage of atomic rays or a magnetic electret in combination with a permanent magnet is especially effective.

One embodiment of the present invention is illustrated in the accompanying drawings.

Figure 1:
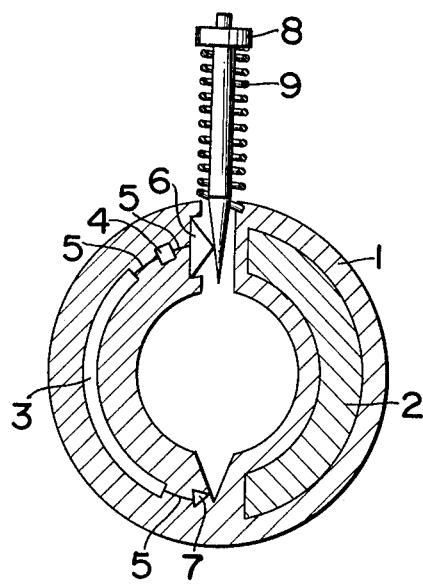
FIG. 1 shows a structure of a ring-type cigarette filter (smoker's set) including a magnetic filed for magnetization and a conductive wire circuit.
Figure 2:
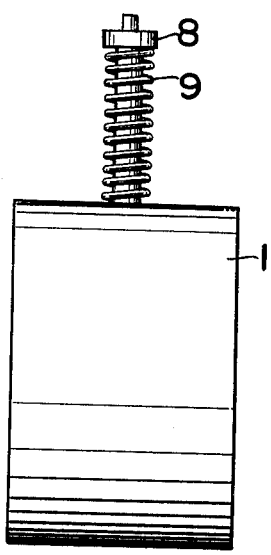
FIG. 2 is a side view of the structure shown in FIG. 1.
Figure 3:
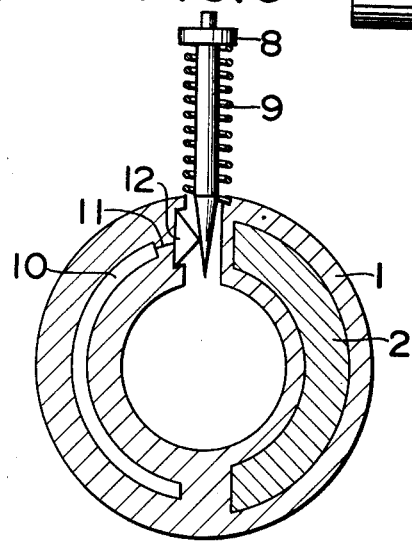
FIG. 3 shows a structure of a ring-type cigarette filter including a magnetic field for magnetization and an electrostatic potential discharge device.

In these Figs., reference numeral 1 denotes a ring-like plastic molded article, and a permanent magnet 2 is disposed in the plastic molded article 1. Further, a battery 3 and a resistance 4 are disposed in the plastic molded article 1. Referential numeral 5 denotes an electric circuit. The battery 3 has a cathode 6 and an anode 7. Reference numeral 8 denotes a needle-like terminal-connecting switch, opening or closing of which is controlled by a spring 9. Reference numeral 10 denotes a radio electret and the electrostatic field of the radio electret 10 is transferred by a conductor 11. Reference numerals 12 and 13 denotes an electrostatic pole and a commercially available cigarette provided with a ring-like cigarette filter, respectively. When the switch 8 is depressed on smoking and inserted into a cigarette and terminals of the circuits are connected (FIGS. 1 and 2) or the potential is transferred (FIG. 3), an electrostatic energy is actuated on the smoke and it is applied together with a permeative magnetic energy from the permanent magnet 2.

The present invention will now be described by reference to the following Examples that by no means limit the scope of the invention but illustrate embodiments of the invention.

EXAMPLE 1

Results of the analysis of smoke formed when the ring-type cigarette filter (smoker's set) of the present invention was employed are shown in Table 5.

TABLE 5

| | Ring-Type Cigarette Filter | Smoke Introduced in Oral Cavity | |
| --- | --- | --- | --- |
| | | decrease (wt. %) of carbon monoxide | decrease (wt. %) of nicotine |
| A. | No ring-type cigarette filter was used (control) | 0 | 0 |
| B. | Ring-type cigarette filter having positive and negative terminal-connecting conductive wire circuit mechanism was used | 20.1 | 27.5 |
| C. | Ring-type cigarette filter having | 15.0 | 25.2 |

TABLE 5-continued

| Ring-Type Cigarette Filter | Smoke Introduced in Oral Cavity | |
|---|---|---|
| | decrease (wt. %) of carbon monoxide | decrease (wt. %) of nicotine |
| mechanism for applying electro-static potential of electret was used | | |
| D. Ring-type cigarette filter having only permanent magnet including magnetic line force-applying mechanism was used | 24.8 | 30.0 |
| E. Ring-type cigarette filter having positive and negative terminal-connecting conductive wire circuit and mechanism for applying magnetic field of permanent magnet was used | 52.7 | 55.0 |
| F. Ring-type cigarette filter having mechanism for applying electro-static potential of electret and mechanism for applying magnetic field of permanent magnet | 58.4 | 50.3 |

Figure 4:
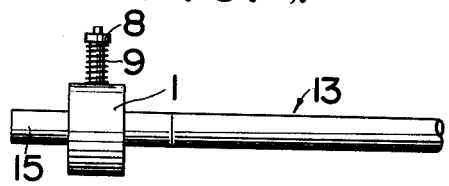
FIG. 4 is a view showing the state where a ring-type cigarette filter as mentioned above is attached to a commercially available cigarette.
Figure 5:
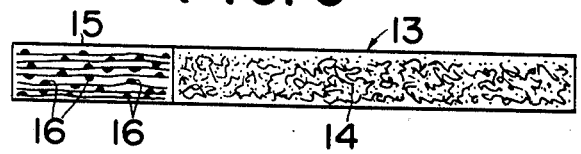
FIG. 5 is a view showing an embodiment in which a mixture 16 of active carbon and magnetized powdered material is dispersed in a filter 15 fixed to one tip end of a portion to be smoked of a cigarette.

Commercially available filter-tipped cigarettes including a filter of an acetate fiber layer, which are sold under the tradename "PALL MALL", were used as control cigarettes. Various ring-like cigarette filters (smoker's sets), as shown in FIG. 4, were attached to the control cigarettes. These filters were 18 mm in outer diameter, 7.8 mm in inner diameter and 8 mm in thickness. Structures of these filters will now be described by using the referential numerals appearing in the drawings.

Ring-Type cigarette filter B

A ultra-small battery 3 arranged so that a current of 2.8 μA was caused to flow in an uncovered needle-like conductive wire circuit (4, 5, 6, 7 and 8) by connecting the terminals thereof was built in the ring-type cigarette filter.

Ring-type cigarette filter C

A radio electret 10 composed of Tefron resin was arranged to transmit a surface electro-static potential energy of $1.2 \times 10^{-7}$ coulomb/cm$^2$ to a smoke passage through an uncovered needle-like conductive wire (depressing needle 8). The ratio electret was built in the ring-like cigarette filter.

Ring-type cigarette filter D

Only a permanent magnet having a magnetic flux density of 700 Gauss and a coercive force of 850 Oe was built in the ring-type eigarette filter.

Ring-type cigarette filter E

The same ultra-small bettery 3 as mentioned above with respect to the filter B and a permanent magnet 2 having a magnetic flux density of 700 Gauss and a coercive force of 850 Oe were built in the ring-type cigarette filter.

Ring-type cigarette filter F

The same Tefron resin radio electret 10 as mentioned above with respect to the filter C and a permanent magnet 2 having a magnetic flux density of 700 Gauss and a coercive force of 850 Oe were built in the ring-type cigarette filter.

After these ring-type cigarette filters (smoker's sets) were attached to cigarettes, the needle-like terminal-connecting switch 8 was depressed (except in the case of the filter having a permanent magnet alone), and while an electric field was thus being applied, sample cigarettes were burnt and smoke was inhaled according to a known method until about ¾ of the total length of each cigarette from the tip thereof was burnt away. More specifically, the time per inhalation was 2 seconds, the inhalation interval was 30 seconds and the inhaled volume was 40 ml/2 seconds. Under these conditions, by using a known smoking machine, cigarettes were burnt and formed smoke was trapped. The quantities of carbon monoxide and nicotine in these trapped smokes were determined by a known analyzing method. The measured values are indicated in Table 5 above. In Table 5, each value is a mean value obtained by conducting the test on 10 sample cigarettes.

From the results shown in Table 5, it is apparent that remarkable effects can be attained by the ring-type cigarette filters of the present invention.

When the above test was similarly made by changing the thickness of the ring-type cigarette filter to 2 mm or 15 mm, similar results were obtained.

In conventional products such as acetate filters, cotton filters, active carbon filters and the like, the filtering capacity is naturally limited because the inhalation resistance and air permeation is chosen within ranges providing good smoking conditions. In contrast, the ring-type cigarette filter has no factors inhibiting good smoking conditions, such as the inhalation resistance and the air permeation surface. Furthermore, in conventional pipes or holders, there is often experienced an unpleasant smell caused by remaining tobacco tar and the like. In contrast, products of the present invention are quite free of such an unpleasant smell and do not impair the taste of tobacco.

EXAMPLE 2

Results of another experiment showing effects of the present invention are shown in Table 6.

TABLE 6

| Cigarette Filter | Smoke Introduced in Oral Cavity | |
|---|---|---|
| | decrease (wt. %) of carbon monoxide | decrease (wt. %) of hydrogen |
| G. filter free of active carbon and powder of magnetized material (control) | 0 | 0 |
| H. filter including | 17.0 | 22.0 |

TABLE 6-continued

| Cigarette Filter | Smoke Introduced in Oral Cavity | |
|---|---|---|
| | decrease (wt. %) of carbon monoxide | decrease (wt. %) of hydrogen |
| active carbon alone | | |
| I. filter including mixture 16 of active carbon and powder of magnetized material | 31.0 | 40.0 |
| J. filter including only powder (10 mg) of magnetized material (control) | 10.0 | 7.5 |

Table 6 illustrates results of the analysis of smoke passed through a filter comprising the magnetized active carbon composition consisting of active carbon and a magnetized material mixed therewith (magnetized by the above-mentioned saturation magnetization method). Cigarettes having a filter of an acetate fiber layer, which are commercially available under the tradename "Peace" in Japan, were used as sample cigarettes (control). The filter 15 was taken out of a portion 14 to be smoked, and instead, a filter comprising 30 mg of active carbon having a size of 100 to 110 mesh (control) or a filter comprising 20 mg of active carbon of size 100–110 mesh and 10 mg of magnetized powdered material consisting of a mixture of 2 mg of Fe having a size of 0.1$\mu$, 4 mg of $\gamma$-$Fe_2O_3$ having a size of 1.3$\mu$ and 4 mg of $Fe_3O_4$ having a size of 1.8$\mu$ was attached to the smoked portion 14 again. According to the method described in Example 1, the cigarette was burnt and smoke was inhaled until about ⅔ of the total length was burnt away. Carbon monoxide and hydrogen in inhaled smoke were determined to obtain results shown in the above Table 6. In the Table 6, each value is a mean value obtained by conducting the test on 10 sample cigarettes.

From the above results, it will readily be understood that the filter containing the composition of the present invention has the highest effect among the foregoing filters.

EXAMPLE 3

In order to clarify the effects attainable by combined use of a ring-type electromagnetic field-applying device in using a cigarette filter comprising active carbon and powdery magnetized material, the experiments A, B, C, D, E and F described in Example 1 were conducted under the same conditions by using as a control sample the same "Peace" cigarette provided with a filter comprising active carbon and magnetized material, as used in the experiment I described in Example 2.

Results of the analysis of smoke are shown in Table 7.

TABLE 7

| Experiment No. | Smoke Introduced in Oral Cavity | |
|---|---|---|
| | decrease (wt. %) of carbon monoxide | decrease (wt. %) of hydrogen |
| $A_I$ | 0 | 0 |
| $B_I$ | 25.6 | 23.2 |
| $C_I$ | 20.0 | 29.0 |
| $D_I$ | 35.1 | 39.5 |
| $E_I$ | 57.7 | 57.7 |

TABLE 7-continued

| Experiment No. | Smoke Introduced in Oral Cavity | |
|---|---|---|
| | decrease (wt. %) of carbon monoxide | decrease (wt. %) of hydrogen |
| $F_I$ | 59.0 | 55.4 |

As is apparent from the foregoing results, the effects of a cigarette filter comprising active carbon and magnetized material are highly accelerated and enhanced by overlapped application of magnetic and electric fields by the above-mentioned ring-type device, and significant contributions can be attained in improving of ratios of removal of carbon monoxide and hydrogen.

EXAMPLE 4

In order to compare the magnetized active carbon composition of the present invention with conventional active carbon products with respect to the catalytic effect on nitrogen oxides (the catalytic conversion of nitrogen oxides to nitrogen of the nitrate state), comparative experiments were conducted according to the following methods A, AN, B and BN.

Method A 0.05 g of conventional active carbon and 0.05 g of a magnetized active carbon composition comprising 0.03 g of the same conventional active carbon and 0.02 g of $Fe_3O_4$ homogeneously mixed with the active carbon were separately mixed with 40 g of air-dried paddy field soil, and the mixtures were placed in long bottomed cylinders (3.2 cm in inner diameter and 10 cm in height). Water was added to each mixture and the mixture was sufficiently agitated to remove bubbles. Then, water was further added to cover the soil portion to a depth of 1 cm. The filled cylinders were allowed to stand still at 35° C. for 3 weeks. The contents of nitrogen oxides and nitrogen of the nitrate state formed during this period were determined.

Method AN

The experiment was conducted in the same manner as in the above method A except that a homogeneous mixture of 40 g of air-dried paddy field soil and 0.04 g of a nitrogeneous fertilizer (urea) was used instead of the soil used in the method A. The contents of nitrogen oxides and nitrogen of the nitrate state were similarly determined.

Method B

The experiment was conducted in the same manner as in the above method A except that no active carbon was used. The contents of nitrogen oxides and nitrogen of the nitrate state were similarly determined.

Method BN

The experiment was conducted in the same manner as in the above method B except that a homogeneous mixture of 40 g of air-dried paddy field soil and 0.04 g of a nitrogeneous fertilizer (urea) was used. The contents of nitrogen oxides and nitrogen of the nitrate state were similarly determined.

TABLE 8

| Sample Tested | Nitrogen Oxide Content (ppm in 100g of air-dried paddy field soil) | Nitrate Form Nitrogen Content (mg per 100g of air-dried paddy field soil) |
|---|---|---|
| Method A: | | |
| conventional active carbon (control) | 8.3 | 0.20 |
| magnetized active carbon composition | 6.1 | 0.35 |
| Method B: | | |
| conventional active carbon (control) | 60.0 | 11.55 |
| magnetized active carbon composition | 45.2 | 19.00 |
| Method B (reference) | 75.0 | 0.09 |
| Method BN (reference) | 250.0 | 2.32 |

*:the nitrogen oxide content (ppm) was a value as calculated as $NO_2$.

As is apparent from the above results, the magnetized active carbon composition shows an increase in the nitrate state nitrogen-forming effect of from about 64 to about 75% over the effect attainable by conventional active carbon, and an increase in the nitrogen oxide formation-controlling effect of from about 33 to about 36% over the controlling effect attainable by conventional active carbon. In short, the magnetized active carbon composition of the present invention has excellent effects with respect to reactions in soils.

EXAMPLE 5

Results of another experiment showing effects of the present invention are shown in Table 9.

TABLE 9

| Cigarette Filter | Smoke Introduced in Oral Cavity | |
|---|---|---|
| | Decrease of carbon monoxide (wt. %) | Decrease of hydrogen (wt. %) |
| H (control) | 16.8 | 21.7 |
| $\gamma$-$Fe_2O_3$ + active carbon | | |
| $I_1$ (magnetized) | 19.2 | 25.4 |
| $I_2$ (nonmagnetized) | 16.9 | 21.2 |
| $Ba \cdot Fe_{12}O_{19}$ + active carbon | | |
| $I_1$ | 19.5 | 26.1 |
| $I_2$ | 16.7 | 22.0 |
| $Ba_2Fe_2Fe_{16}O_{27}$ + active carbon | | |
| $I_1$ | 18.8 | 26.5 |
| $I_2$ | 16.3 | 22.3 |
| $Fe \cdot TiO_3$ + active carbon | | |
| $I_1$ | 19.7 | 27.0 |
| $I_2$ | 16.9 | 22.5 |
| $FeTiO_3 \cdot Fe_2O_3$ + active carbon | | |
| $I_1$ | 19.8 | 26.2 |
| $I_2$ | 17.0 | 22.1 |
| (Ce-MM)$Co_5$ + active carbon | | |
| $I_1$ | 20.0 | 25.0 |
| $I_2$ | 16.9 | 22.0 |

Table 9 illustrates results of the analysis of smoke passed through a filter comprising 30 mg of active carbon having a size of 100 to 110 mesh (control; H), and a filter comprising 27 mg of active carbon of 100 to 110 mesh and 3 mg of $\gamma$-$Fe_2O_3$, $BaFe_{12}O_{19}$, $Ba_2Fe_2 \cdot Fe_{1-6}O_{27}$, $FeTiO_3$, $FeTiO_3 \cdot Fe_2O_3$ or (Ce-MM)$Co_5$ having a size 25 microns ($I_1$ and $I_2$). The experiment was carried out according to Example 2. In "$I_1$" of Table 9, there was used the composition comprising the active carbon and the magnetized ferromagnetic material obtained by magnetizing the above material by the conventional method of saturation magnetization. In "$I_2$", there was used the composition comprising the active carbon and the non-magnetized ferromagnetic material.

EXAMPLE 6

Experiments showing effects of the present invention were carried out.

The following sample cigarettes were used to determine the ratios of residual tar content in the cigarette smoke.

Sample (a)

A cigarette having a filter of an acetate fiber layer, which is commercially available under the tradename "Peace" in Japan.

Sample (b)

A cigarette obtained by first removing the acetate fiber filter from the cigarette of sample (a), then including in the filter 30 mgs. of active carbon of a size of 100 mesh and attaching the resulting filter to the cigarette body.

Sample (c)

A cigarette obtained by following sample (b) except that a blend comprising 20 mgs. of active carbon of a size of 100 mesh and 10 mgs. of non-magnetized magnetic iron oxide is used instead of the active carbon.

Sample (d)

A cigarette having exactly the same composition and ratios as sample (c), except that the magnetic iron oxide is magnetized according to the conventional saturation magnetization method.

The sample cigarettes (a), (b), (c) and (d) were burnt and inhaled in the order named by means of a smoking machine at the following standard smoking cycle.

| | |
|---|---|
| Inhalation time: | 2 seconds |
| Inhalation interval: | 58 seconds |
| Inhalation volume for each inhalation: | 35 ml |
| Inhalation number per cigarette: | 7 |

The inhaled smoke from each cigarette was made to pass through an ethanol solution for absorption of the tar content of the smoke. The respective ethanol solutions were then subjected to a light-absorption test with a light source of 430 $\mu$m.

The ratio of the absorbance of sample (a) to that of samples (b), (c) and (d) is defined as the ratio of the residual tar content in the smoke. Lower values show more efficient removal of tar.

The measurement was made 5 times for each of the samples (a)–(d) in the order named. The average of three intermediate values, with the highest and lowest values eliminated, was recorded as the mean residual tar content ratio. The following table shows the results of the above test.

TABLE 10

| Samples | 1 | 2 | 3 | mean |
|---|---|---|---|---|
| (a) Cigarette with acetate fiber filter | 100 | 100 | 100 | 100 |
| (b) Cigarette with acetate | 66 | 70 | 68 | 68 |

TABLE 10-continued

| Samples | 1 | 2 | 3 | mean |
|---|---|---|---|---|
| fiber + active carbon | | | | |
| (c) Cigarette with acetate fiber + active carbon + magnetic iron oxide (non-magnetized) | 59 | 58 | 57 | 68 |
| (d) Cigarette with acetate fiber + active carbon + magnetic iron oxide (magnetized) | 48 | 47 | 49 | 48 |

Note:
(1) The magnetic iron oxide used for cigarette (c) was $\gamma$-Fe$_2$O$_3$ of 350 mesh not containing non-magnetic iron oxide ($\alpha$-Fe$_2$O$_3$) and was not magnetized.
(2) The magnetic iron oxide used for cigarette (d) was obtained by magnetizing $\gamma$-Fe$_2$O$_3$ of 350 mesh by the conventional method of saturation magnetization.

From the above results, it will readily be understood that the residual tar content is more significantly reduced by the use of magnetized ferromagnetic material.

EXAMPLE 7

Experiments showing effects of the present invention were conducted according to the following method.

(a) 0.05 g of conventional active carbon, (b) 0.05 g of a magnetized active carbon composition comprising 0.03 g of the same conventional active carbon and 0.02 g of the ferromagnetic material as mentioned in the below Table 11 homogeneously mixed with the active carbon (the magnetized material was obtained by the above-mentioned saturation magnetization method), and (c) 0.05 g of a non-magnetized active carbon composition comprising 0.03 g of the same conventional active carbon and 0.02 g of the ferromagnetic material (non-magnetized material) were separately placed into long bottomed cylinders (3.2 cm in inner diameter and 10 cm in height), together with 40 g of air-dried paddy field soil. Water was added to each mixture and the mixture was sufficiently agitated to remove bubbles. Then, additional water was added to cover the soil portion to a depth of 1 cm. The filled cylinders were allowed to stand still at 35° C. for 3 weeks. The contents of nitrogen oxides and nitrogen of the nitrate state formed during this period were determined.

TABLE 11

| Sample Tested | | Nitrogen Oxide Content (ppm in 100 g of air-dried paddy field soil) | Nitrate Form Nitrogen Content (mg per 100 g of air-dried paddy field soil) |
|---|---|---|---|
| Control (a) | | 8.2 | 0.21 |
| NiFe$_2$O$_4$ + active carbon(b) | | 6.0 | 0.36 |
| | (b') | 5.7 | 0.40 |
| | (c) | 8.3 | 0.19 |
| | (c') | 8.0 | 0.23 |
| CoFe$_2$O$_4$ + active carbon(b) | | 6.4 | 0.36 |
| | (b') | 6.0 | 0.39 |
| | (c) | 8.5 | 0.18 |
| | (c') | 8.0 | 0.22 |
| MnFe$_2$O$_4$ + active carbon(b) | | 6.5 | 0.37 |
| | (b') | 6.2 | 0.41 |
| | (c) | 8.4 | 0.19 |
| | (c') | 7.9 | 0.23 |
| $\gamma$-Fe$_2$O$_3$ + active carbon(b) | | 6.7 | 0.35 |
| | (b') | 6.0 | 0.39 |
| | (c) | 8.3 | 0.19 |
| | (c') | 7.8 | 0.24 |
| CuFe$_2$O$_4$ + active carbon(b) | | 6.9 | 0.37 |
| | (b') | 6.5 | 0.40 |
| | (c) | 8.4 | 0.20 |
| | (c') | 8.2 | 0.22 |
| Mg . Fe$_2$O$_4$ + active carbon(b) | | 6.5 | 0.36 |
| | (b') | 6.2 | 0.38 |
| | (c) | 8.4 | 0.16 |
| | (c') | 8.1 | 0.18 |
| Li$_{0.5}$Fe$_{2.5}$C$_4$ + active carbon | | | |
| | (b) | 6.7 | 0.36 |
| | (b') | 6.5 | 0.40 |
| | (c) | 8.6 | 0.17 |
| | (c') | 8.3 | 0.19 |
| BaFe$_{12}$O$_{19}$ + active carbon | | | |
| | (b) | 6.9 | 0.37 |
| | (b') | 6.5 | 0.39 |
| | (c) | 8.5 | 0.18 |
| | (c') | 8.4 | 0.23 |
| SrO . 6Fe$_2$O$_3$ + active carbon | | | |
| | (b) | 6.5 | 0.36 |
| | (b') | 6.3 | 0.38 |
| | (c) | 8.7 | 0.19 |
| | (c') | 8.3 | 0.21 |
| BaO . 6Fe$_2$O + active carbon | | | |
| | (b) | 6.6 | 0.37 |
| | (b') | 6.2 | 0.37 |
| | (c) | 8.7 | 0.19 |
| | (c') | 8.3 | 0.21 |
| CaFe$_4$O$_7$ + active carbon | | | |
| | (b) | 6.8 | 0.37 |
| | (b') | 6.5 | 0.37 |

TABLE 11-continued

| Sample Tested | | Nitrogen Oxide Content (ppm in 100 g of air-dried paddy field soil) | Nitrate Form Nitrogen Content (mg per 100 g of air-dried paddy field soil) |
|---|---|---|---|
| | (c) | 8.8 | 0.15 |
| | (c') | 8.5 | 0.17 |
| $Ba_2Mg_2Fe_{12}O_{22}$ + active carbon | | | |
| | (b) | 7.0 | 0.36 |
| | (b') | 6.8 | 0.35 |
| | (c) | 8.6 | 0.14 |
| | (c') | 8.4 | 0.18 |
| $BaMn_2Fe_{16}O_{27}$ + active carbon | | | |
| | (b) | 6.7 | 0.36 |
| | (b') | 6.5 | 0.37 |
| | (c) | 8.7 | 0.14 |
| | (c') | 8.5 | 0.17 |
| $Ba_2Mn_2Fe_{12}O_{22}$ + active carbon | | | |
| | (b) | 6.9 | 0.38 |
| | (b') | 6.7 | 0.38 |
| | (c) | 8.5 | 0.15 |
| | (c') | 8.3 | 0.17 |
| $Ba_2Fe_{18}O_{27}$ + active carbon | | | |
| | (b) | 7.0 | 0.37 |
| | (b') | 6.5 | 0.38 |
| | (c) | 8.7 | 0.19 |
| | (c') | 8.5 | 0.20 |
| $Ba_2Co_2Fe_{12}O_{22}$ + active carbon | | | |
| | (b) | 6.5 | 0.39 |
| | (b') | 6.3 | 0.40 |
| | (c) | 8.7 | 0.18 |
| | (c') | 8.4 | 0.21 |
| $Ba_3Co_2Fe_{24}O_{41}$ + active carbon | | | |
| | (b) | 6.9 | 0.38 |
| | (b') | 6.5 | 0.39 |
| | (c) | 8.7 | 0.17 |
| | (c') | 8.1 | 0.22 |
| $BaNi_2Fe_{16}O_{27}$ × active carbon | | | |
| | (b) | 7.2 | 0.37 |
| | (b') | 7.0 | 0.39 |
| | (c) | 8.8 | 0.19 |
| | (c') | 8.4 | 0.22 |
| $Ba_2Ni_2Fe_{12}O_{22}$ + active carbon | | | |
| | (b) | 7.5 | 0.39 |
| | (b') | 7.0 | 0.40 |
| | (c) | 8.9 | 0.18 |
| | (c') | 8.5 | 0.19 |
| $Ba_3Cu_2Fe_{24}O_{41}$ + active carbon | | | |
| | (b) | 6.8 | 0.38 |
| | (b') | 6.7 | 0.39 |
| | (c) | 8.7 | 0.19 |
| | (c') | 8.3 | 0.21 |
| $Ba_2Zn_2Fe_{12}O_{22}$ + active carbon | | | |
| | (b) | 6.9 | 0.39 |
| | (b') | 6.6 | 0.40 |
| | (c) | 8.7 | 0.18 |
| | (c') | 8.5 | 0.19 |
| $Ba_3Zn_2F_{24}C_{41}$ + active carbon | | | |
| | (b) | 7.3 | 0.38 |
| | (b') | 6.9 | 0.39 |
| | (c) | 8.9 | 0.17 |
| | (c') | 8.7 | 0.22 |
| $Y_3Fe_5O_{12}$ + active carbon | | | |
| | (b) | 7.3 | 0.35 |
| | (b') | 6.7 | 0.37 |
| | (c) | 8.8 | 0.18 |
| | (c') | 8.5 | 0.23 |
| $Sm_3Fe_5O_{12}$ + active carbon | | | |
| | (b) | 7.7 | 0.34 |
| | (b') | 7.0 | 0.36 |
| | (c) | 8.9 | 0.19 |
| | (c') | 8.7 | 0.20 |
| $Eu_3Fe_5O_{12}$ + active carbon | | | |
| | (b) | 7.0 | 0.35 |
| | (b') | 6.8 | 0.36 |
| | (c) | 8.9 | 0.18 |
| | (c') | 8.0 | 0.20 |
| $Gd_3Fe_5O_{12}$ + active carbon | | | |
| | (b) | 7.4 | 0.36 |
| | (b') | 7.0 | 0.37 |
| | (c) | 8.8 | 0.17 |

TABLE 11-continued

| Sample Tested | | Nitrogen Oxide Content (ppm in 100 g of air-dried paddy field soil) | Nitrate Form Nitrogen Content (mg per 100 g of air-dried paddy field soil) |
|---|---|---|---|
| | (c') | 8.5 | 0.19 |
| $Tb_3Fe_5O_{12}$ + active carbon | | | |
| | (b) | 7.0 | 0.35 |
| | (b') | 6.8 | 0.36 |
| | (c) | 8.7 | 0.17 |
| | (c') | 8.4 | 0.19 |
| $Dy_3Fe_5O_{12}$ + active carbon | | | |
| | (b) | 7.5 | 0.34 |
| | (b') | 7.0 | 0.36 |
| | (c) | 8.8 | 0.18 |
| | (c') | 8.2 | 0.19 |
| $Ho_3Fe_5O_{12}$ + active carbon | | | |
| | (b) | 7.2 | 0.33 |
| | (b') | 7.0 | 0.35 |
| | (c) | 8.5 | 0.13 |
| | (c') | 8.2 | 0.17 |
| $Er_3Fe_5O_{12}$ + active carbon | | | |
| | (b) | 7.0 | 0.34 |
| | (b') | 6.8 | 0.36 |
| | (c) | 8.5 | 0.15 |
| | (c') | 8.3 | 0.18 |
| $Tm_3Fe_5O_{12}$ + active carbon | | | |
| | (b) | 7.5 | 0.35 |
| | (b') | 7.0 | 0.36 |
| | (c) | 8.9 | 0.16 |
| | (c') | 8.5 | 0.20 |
| $Yb_3Fe_5O_{12}$ + active carbon | | | |
| | (b) | 7.7 | 0.35 |
| | (b') | 7.5 | 0.35 |
| | (c) | 8.9 | 0.15 |
| | (c') | 8.6 | 0.18 |
| $Lu_3Fe_5O_{12}$ + active carbon | | | |
| | (b) | 6.8 | 0.35 |
| | (b') | 6.5 | 0.36 |
| | (c) | 8.2 | 0.16 |
| | (c') | 8.0 | 0.19 |
| $La_{0.7}Sr_{0.3}MnO_3$ + active carbon | | | |
| | (b) | 6.9 | 0.35 |
| | (b') | 6.7 | 0.36 |
| | (c) | 8.4 | 0.17 |
| | (c') | 8.4 | 0.22 |
| $Bi_{0.7}Ca_{0.3}MnO_3$ + active carbon | | | |
| | (b) | 6.8 | 0.36 |
| | (b') | 6.5 | 0.37 |
| | (c) | 8.7 | 0.17 |
| | (c') | 8.2 | 0.24 |
| $Nd_{0.5}Ca_{0.2}MnO_3$ + active carbon | | | |
| | (b) | 7.0 | 0.34 |
| | (b') | 6.8 | 0.35 |
| | (c) | 8.7 | 0.16 |
| | (c') | 8.4 | 0.22 |
| $Nd_{0.6}Sr_{0.4}MnO_3$ + active carbon | | | |
| | (b) | 6.9 | 0.35 |
| | (b') | 6.8 | 0.36 |
| | (c) | 8.5 | 0.17 |
| | (c') | 8.1 | 0.25 |
| $Nd_{0.6}Ba_{0.4}MnO_3$ + active carbon | | | |
| | (b) | 7.2 | 0.35 |
| | (b') | 7.0 | 0.34 |
| | (c) | 8.7 | 0.16 |
| | (c') | 8.5 | 0.23 |
| $Gd_2CoMnO_5$ + active carbon | | | |
| | (b) | 6.8 | 0.34 |
| | (b') | 6.5 | 0.36 |
| | (c) | 8.4 | 0.17 |
| | (c') | 8.2 | 0.24 |
| $FeTiO_3$ + active carbon | | | |
| | (b) | 6.9 | 0.38 |
| | (c) | 8.7 | 0.25 |
| $NiTiO_3$ + active carbon | | | |
| | (b) | 7.0 | 0.39 |
| | (c) | 9.0 | 0.26 |
| $CoTiO_3$ + active carbon | | | |
| | (b) | 6.1 | 0.39 |
| | (c) | 8.5 | 0.25 |
| $MnTiO_3$ + active carbon | | | |

TABLE 11-continued

| Sample Tested | | Nitrogen Oxide Content (ppm in 100 g of air-dried paddy field soil) | Nitrate Form Nitrogen Content (mg per 100 g of air-dried paddy field soil) |
|---|---|---|---|
| | (b) | 6.9 | 0.38 |
| | (c) | 8.8 | 0.24 |
| $FeTiO_3 \cdot Fe_2O_3$ + active carbon | | | |
| | (b) | 7.5 | 0.40 |
| | (c) | 8.4 | 0.25 |
| $NiTiO_3 \cdot Fe_2O_3$ + active carbon | | | |
| | (b) | 7.3 | 0.41 |
| | (c) | 8.6 | 0.26 |
| $CoTiO_3Fe_2O_3$ + active carbon | | | |
| | (b) | 7.0 | 0.40 |
| | (c) | 8.8 | 0.24 |
| $MnTiO_3Fe_2O_3$ + active carbon | | | |
| | (b) | 6.9 | 0.38 |
| | (c) | 8.5 | 0.17 |
| $CrO_2$ + active carbon | (b) | 7.5 | 0.33 |
| | (b') | 7.0 | 0.34 |
| | (c) | 8.7 | 0.17 |
| | (c') | 8.4 | 0.19 |
| $Co_{24}Ni_{14}Al_8Cu_3Fe_{bal}$ + active carbon | | | |
| | (b) | 6.9 | 0.38 |
| | (b') | 6.5 | 0.38 |
| | (c) | 8.4 | 0.18 |
| | (c') | 8.3 | 0.24 |
| $Co_{34}Ni_{15}Al_7Ti_5Cu_4Fe_{bal}$ + active carbon | | | |
| | (b) | 6.8 | 0.39 |
| | (c) | 8.5 | 0.23 |
| $Co_{50-54}V_{8-14}Fe_{bal}$ + active carbon | | | |
| | (b) | 6.7 | 0.37 |
| | (c) | 8.5 | 0.20 |
| CoPt + active carbon | (b) | 6.6 | 0.39 |
| | (c) | 8.7 | 0.25 |
| $Y \cdot Co_5$ + active carbon | | | |
| | (b) | 6.7 | 0.39 |
| | (c) | 8.8 | 0.24 |
| $CeCO_5$ + active carbon | | | |
| | (b) | 6.9 | 0.40 |
| | (c) | 8.6 | 0.23 |
| $PrCO_5$ + active carbon | | | |
| | (b) | 6.0 | 0.39 |
| | (c) | 8.8 | 0.21 |
| $SmCO_5$ + active carbon | | | |
| | (b) | 6.0 | 0.39 |
| | (c) | 8.9 | 0.19 |
| $(Ce-MM)Co_5$ + active carbon | | | |
| | (b) | 6.7 | 0.40 |
| | (c) | 8.5 | 0.19 |
| $Sm_2(CoFe)_{17}$ + active carbon | | | |
| | (b) | 6.2 | 0.39 |
| | (c) | 8.5 | 0.18 |
| $Pr(CoFe)_{17}$ + active carbon | | | |
| | (b) | 6.2 | 0.40 |
| | (c) | 8.8 | 0.18 |
| $Pr_{0.55}Sm_{0.45}Co_5$ + active carbon | | | |
| | (b) | 6.6 | 0.38 |
| | (c) | 8.9 | 0.18 |
| $La_{0.5}Sm_{0.5}Co_5$ + active carbon | | | |
| | (b) | 6.8 | 0.39 |
| | (c) | 8.6 | 0.19 |
| $MM_{0.5}Sm_{0.5}Co_5$ + active carbon | | | |
| | (b) | 6.7 | 0.39 |
| | (c) | 8.7 | 0.18 |
| $Ce_{0.5}Sm_{0.5}Co_5$ + active carbon | | | |
| | (b) | 6.8 | 0.38 |
| | (c) | 8.7 | 0.17 |
| $Sm_{0.75}Ce_{0.25}Co_{3.5}CuFe_{0.5}$ + active carbon | | | |
| | (b) | 6.0 | 0.39 |
| | (c) | 8.5 | 0.20 |

Note:
(1) The nitrogen oxide content (ppm) shows a value as calculated as $NO_2$.
(2) (b') is a titanium or titanium oxide solid solution of (b) and (c') is a titanium or titanium oxide solid solution of (c).

EXAMPLE 8

The magnetized active carbon composition of the present invention may be used to recover uranium from sea water. (a) 30 g of the conventional active carbon, (b) 30 g of the magnetized active carbon composition comprising the same conventional active carbon and 5% by weight of the alloy of the precipitation hardening-type structure, $Co_{34}Ni_{15}Al_7Ti_5Cu_4Fe_{bal}$, of a size 0.8 microns (magnetized by the above-mentioned saturation magnetization method), and (c) 30 g of a non-magnetized active carbon composition comprising the active carbon and 5% by weight of non-magnetized alloy of the precipitation hardening-type structure, which were separately placed into cylindrical filter paper, were dipped in sea water for one week. Then, the active carbon composition was taken out, washed with water and dried. Thereafter, the presence of uranium was confirmed by fluorescent X-ray method, emission spectroscopic analysis and fluorescent of sodium fluoride sphere, and an amount of uranium which was adsorbed was determined with fluorimetry. Table 12 shows the results of the above test.

TABLE 12

| Sample Tested | Adsorption of Uranium (μg) |
|---|---|
| (a) Active Carbon | 0 |
| (b) $Co_{34}Ni_{15}Al_7Ti_5Cu_4Fe_{bal}$ + Active Carbon | 880 |
| (c) $Co_{34}Ni_{15}Al_7Ti_5Cu_4Fe_{bal}$ + Active Carbon (non-magnetized) | 280 |

What is claimed is:

1. A magnetized active carbon composition, which consists essentially of a mixture of 100 parts of active carbon and 5-100 parts by weight of a magnetized ferromagnetic material, said ferromagnetic material having been previously subjected to a saturation magnetization treatment by application of a magnetic treatment prior to preparation of the mixture and said ferromagnetic material being at least one of a member selected from the group consisting of ferrite of the spinel-type structure, ferrite of the magnetoplumbite-type structure, ferrite of the garnet-type structure, ferrite of the probeskite-type structure, ferrite of the ilmenite-type structure, ferrite of the rutile-type structure, ferrite of the ferroxplana-type structure, alloy of the precipitation hardening-type structure, alloy of the γ-α transformation-type structure, alloy of the supper-lattice-type structure and alloy of the rare earth-cobalt-type structure.

2. A magnetized active carbon composition, which consists essentially of a mixture of 100 parts of active carbon and 5-100 parts by weight of a magnetized ferromagnetic material, said composition being prepared by subjecting said mixture of the ferromagnetic material and the active carbon to a saturation magnetization treatment by application of a magnetic field and said ferromagnetic material being at least one of a member selected from the group consisting of ferrite of the spinel-type structure, ferrite of the magneto-plumbite-type structure, ferrite of the garnet-type structure, ferrite of the probeskite-type structure, ferrite of the ilmenite-type structure, ferrite of the rutile-type structure, ferrite of the ferroxplana-type structure, alloy of the precipitation hardening-type structure, alloy of the γ-α transformation-type structure, alloy of the supper-lattice-type structure and alloy of the rare earth-cobalt-type structure.

3. A magnetized active carbon composition according to claim 1 or 2 wherein the ferrite of the spinel-type structure and the saturation magnetization values at 20° C. are respectively

| Ferrite | σ gauss cc/g | Ms gauss | 4πMs gauss |
|---|---|---|---|
| $Fe_3O_4$ | 92 | 480 | 6000 |
| $MnFe_2O_4$ | 80 | 400 | 5000 |
| $CoFe_2O_4$ | 80 | 425 | 5300 |
| $NiFe_2O_4$ | 50 | 270 | 3400 |
| $CuFe_2O_4$ | 25 | 135 | 1700 |
| $MgFe_2O_4$ | 27 | 120 | 1500 |
| $Li_{0.5}Fe_{2.5}O_4$ | 65 | 310 | 3900 |
| $\gamma\text{-}Fe_2O_3$ | — | — | 5800 |

4. A magnetized active carbon composition according to claim 1 or 2 wherein the ferrite of the magnetoplumbite-type structure and the saturation magnetization values at 20° C. are respectively

| Ferrite | 4πMs gauss |
|---|---|
| $BaFe_{12}O_{19}$ | 4800 |
| $BaO \cdot 6Fe_2O_3$ | 4800 |
| $SrO \cdot 6Fe_2O_3$ | 4500 |
| $CaFe_4O_7$ | 980 |

5. A magnetized active carbon composition according to claim 1 or 2 wherein the ferrite of the garnet-type structure and the saturation magnetization values at 20° C. are respectively

| Ferrite | 4πMs gauss |
|---|---|
| $Y_3Fe_5O_{12}$ | 1740 |
| $Sm_3Fe_5O_{12}$ | 1695 |
| $Eu_3Fe_5O_{12}$ | 1100 |
| $Gd_3Fe_5O_{12}$ | 169 |
| $Tb_3Fe_5O_{12}$ | 190 |
| $Dy_3Fe_5O_{12}$ | 537 |
| $Ho_3Fe_5O_{12}$ | 976 |
| $Er_3Fe_5O_{12}$ | 1308 |
| $Tm_3Fe_5O_{12}$ | 1100 |
| $Yb_3Fe_5O_{12}$ | 1640 |
| $Lu_3Fe_5O_{12}$ | 1500 |

6. A magnetized active carbon composition according to claim 1 or 2 wherein the ferrite of the probeskite-type structure and the saturation magnetization values at 20° C. are respectively

| Ferrite | $M_B$ Wb-m/kg |
|---|---|
| $La_{0.7}Sr_{0.3}MnO_3$ | $3.6 \times 4\pi \times 10^{-7}$ |
| $Bi_{0.7}Ca_{0.3}MnO_3$ | $0.5 \times 4\pi \times 10^{-7}$ |
| $Nd_{0.5}Ca_{0.2}MnO_3$ | $60 \times 4\pi \times 10^{-7}$ |
| $Nd_{0.6}Sr_{0.4}MnO_3$ | $75 \times 4\pi \times 10^{-7}$ |
| $Nd_{0.6}Ba_{0.4}MnO_3$ | $70 \times 4\pi \times 10^{-7}$ |
| $Gd_2CoMnO_5$ | $2.5 \times 4\pi \times 10^{-7}$ |

7. A magnetized active carbon composition according to claim 1 or 2 wherein the ferrite of the ilmenite-type structure and the saturation magnetization values at 20° C. are respectively

| Ferrite | $M_B$ Wb-deg/mol |
|---|---|
| $FeTiO_3$ | $5.23 \times 4\pi \times 10^{-4}$ |
| $NiTiO_3$ | $3.16 \times 4\pi \times 10^{-4}$ |
| $CoTiO_3$ | $5.46 \times 4\pi \times 10^{-4}$ |

-continued

| | |
|---|---|
| MnTiO$_3$ | 4.55 × 4$\pi$ × 10$^{-4}$ |

| | Ms C.G.S. |
|---|---|
| FeTiO$_3$ . Fe$_2$O$_3$ | 0.7 × 7.96 × 10$^8$ |
| NiTiO$_3$ . Fe$_2$O$_3$ | 0.5 × 7.96 × 10$^8$ |
| CoTiO$_3$ . Fe$_2$O$_3$ | 0.45 × 7.96 × 10$^8$ |
| MnTiO$_3$ . Fe$_2$O$_3$ | 0.1 × 7.96 × 10$^8$ |

8. A magnetized active carbon composition according to claim 1 or 2 wherein the ferrite of the rutile-type structure is CrO$_2$ having the saturation magnetization value at 20° C. of 4$\pi$Ms=7200 gauss.

9. A magnetized active carbon composition according to claim 1 or 2 wherein the ferrite of the ferroxplana-type structure and the saturation magnetization values at 20° C. are respectively

| Ferrite | 4$\pi$ Ms gauss |
|---|---|
| Ba$_2$Mg$_2$Fe$_{12}$O$_{22}$ | 1500 |
| BaMn$_2$Fe$_{16}$O$_{27}$ | 3900 |
| Ba$_2$Mn$_2$Fe$_{12}$O$_{22}$ | 2100 |
| Ba$_2$Fe$_2$Fe$_{16}$O$_{27}$ | 4000 |
| Ba$_2$Co$_2$Fe$_{12}$O$_{22}$ | 2300 |
| Ba$_3$Co$_2$Fe$_{24}$O$_{41}$ | 3350 |
| BaNi$_2$Fe$_{16}$O$_{27}$ | 4150 |
| Ba$_2$Ni$_2$Fe$_{12}$O$_{22}$ | 1600 |
| Ba$_3$Cu$_2$Fe$_{24}$O$_{41}$ | 3100 |
| Ba$_2$Zn$_2$Fe$_{12}$O$_{22}$ | 2850 |
| Ba$_3$Zn$_2$Fe$_{24}$O$_{41}$ | 3900 |

10. A magnetized active carbon composition according to claim 1 or 2 wherein the alloy of the precipitation hardening-type structure and the saturation magnetization values are respectively

| Alloy | (B . H)$_{max}$ MgOe |
|---|---|
| Co$_{24}$Ni$_{14}$Al$_8$Cu$_3$Fe$_{bal}$ | 5.2 |
| Co$_{34}$Ni$_{15}$Al$_7$Ti$_5$Cu$_4$Fe$_{bal}$ | 11 |
| Fe$_{40-50\%}$Cr$_{27-30\%}$Co$_{23-25\%}$Mo$_{1\%>}$Si$_{1\%>}$ | 5 |

11. A magnetized active carbon composition according to claim 1 or 2 wherein the alloy of the $\gamma$-$\alpha$ transformation-type structure is Co$_{50-54\%}$V$_{8-14\%}$Fe$_{bal}$ having the saturation magnetization value of (B.H)$_{max}$=5 MGOe.

12. A magnetized active carbon composition according to claim 1 or 2 wherein the alloy of the supper lattice-type structure is CoPt having the saturation magnetization value of (B.H)$_{max}$=9-12 MGOe.

13. A magnetized active carbon composition according to claim 1 or 2 wherein the alloy of the rare earth-cobalt-type structure and the saturation magnetization values at 25° C. are respectively

| Alloy | 4$\pi$ Ms gauss |
|---|---|
| YCo$_5$ | 10600 |
| LaCo$_5$ | 9090 |
| CeCo$_5$ | 7700 |
| PrCo$_5$ | 12000 |
| SmCo$_5$ | 9650 |
| (Ce-MM)Co$_5$ | 8900 |

| | (B . H)$_{max}$ MGOe |
|---|---|
| Sm$_2$(CoFe)$_{17}$ | 55 |
| Pr(CoFe)$_{17}$ | 56 |
| Pr$_{0.55}$Sm$_{0.45}$Co$_5$ | 26 |
| La$_{0.5}$Sm$_{0.5}$Co$_5$ | 13.2 |
| MM$_{0.5}$Sm$_{0.5}$Co$_5$ | 20.0 |
| Ce$_{0.5}$Sm$_{0.5}$Co$_5$ | 13.5 |
| Sm$_{0.75}$Ce$_{0.25}$Co$_{3.5}$CuFe$_{0.5}$ | 12.3 |

14. A magnetized active carbon composition according to claim 1 or 2 which comprises 20 mg of active carbon of size 100–110 mesh and 10 mg of magnetized powdered material consisting of a mixture of 2 mg of Fe of size 0.1 microns, 4 mg of $\gamma$-Fe$_2$O$_3$ of size 1.3 microns and 4 mg of Fe$_3$O$_4$ of size 1.8 microns.

* * * * *